May 12, 1942.  W. K. BERTHOLD  2,282,848
APPARATUS FOR BLOWING AND COOLING GLASSWARE
Filed March 17, 1939  3 Sheets-Sheet 1

Inventor:
Walter K. Berthold
by Brown & Parham
Attorneys.

Witness:
U. A. Horn

May 12, 1942.  W. K. BERTHOLD  2,282,848
APPARATUS FOR BLOWING AND COOLING GLASSWARE
Filed March 17, 1939  3 Sheets-Sheet 2
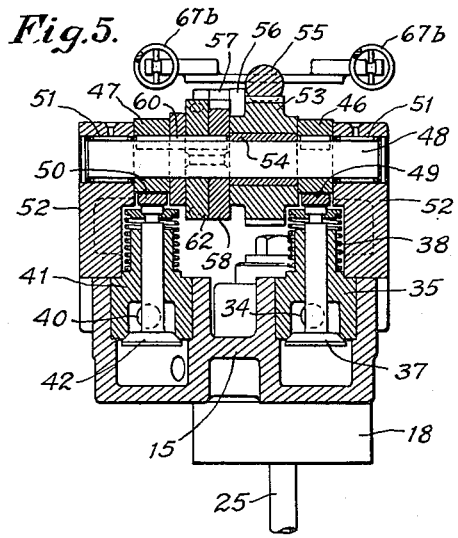
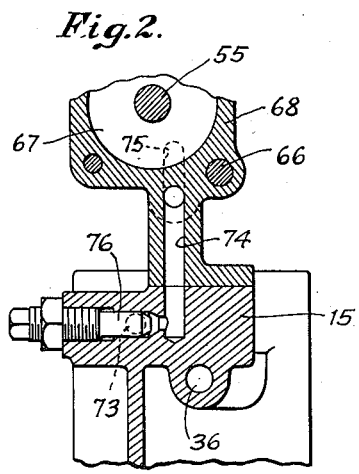
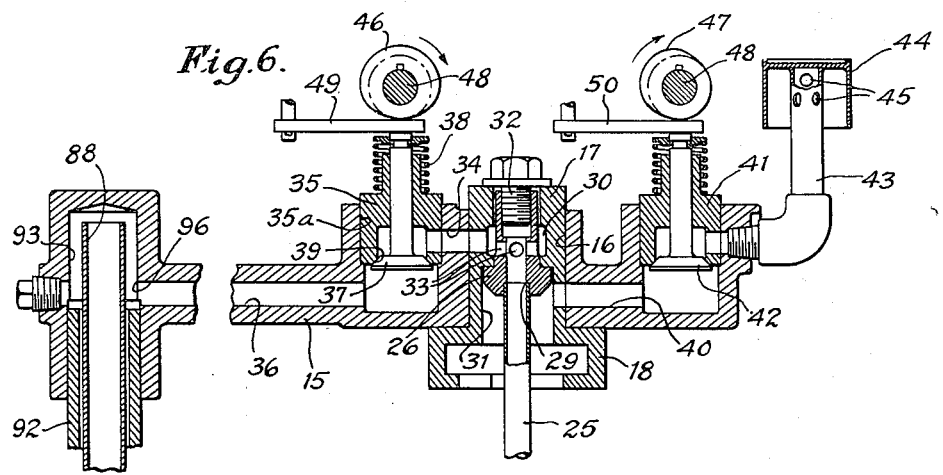
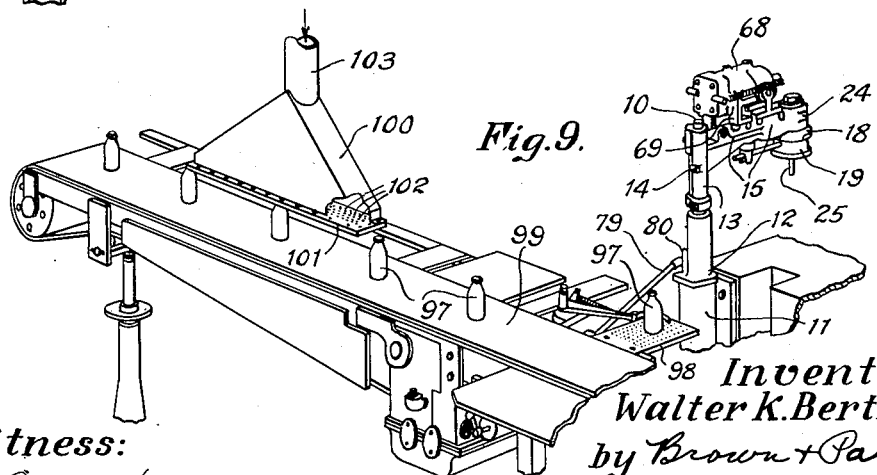
Inventor:
Walter K. Berthold
by Brown + Parham
Attorneys.
Witness:
A. A. Horn May 12, 1942.  W. K. BERTHOLD  2,282,848
APPARATUS FOR BLOWING AND COOLING GLASSWARE
Filed March 17, 1939  3 Sheets-Sheet 3
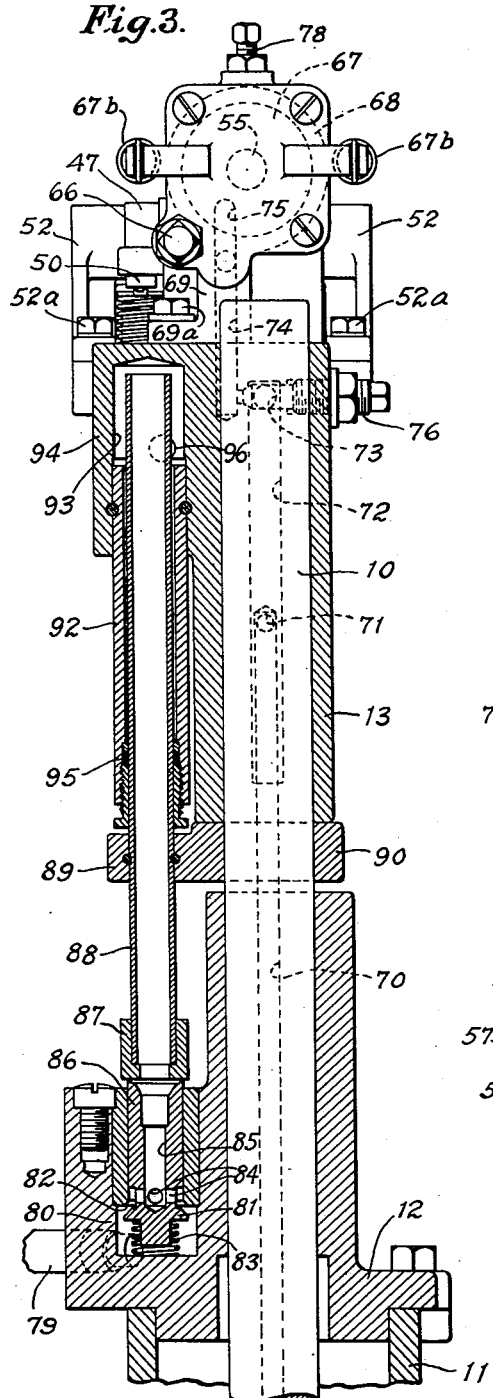
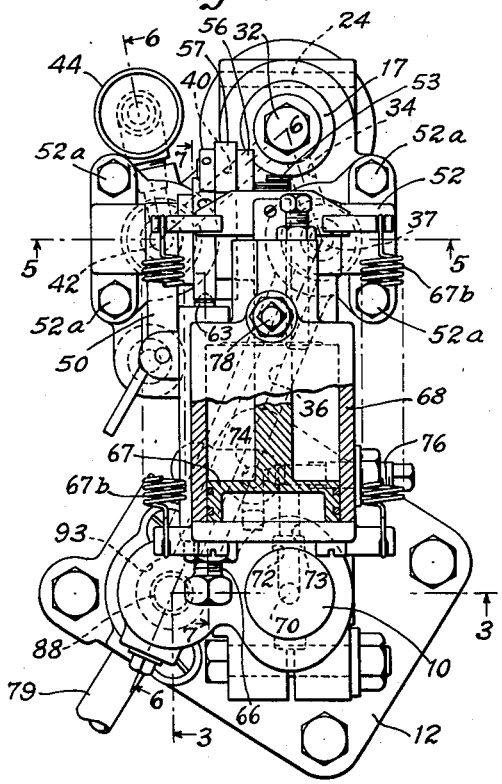
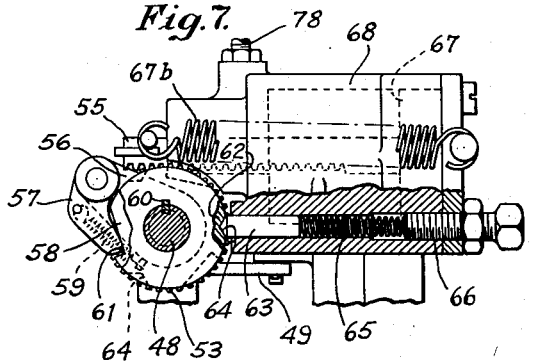
Inventor:
Walter K. Berthold
by Brown & Parham
Attorneys.

Patented May 12, 1942

2,282,848

UNITED STATES PATENT OFFICE 2,282,848

APPARATUS FOR BLOWING AND COOLING GLASSWARE

Walter K. Berthold, Rockville, Conn., assignor to Hartford-Empire Company, Hartford, Conn., a corporation of Delaware Application March 17, 1939, Serial No. 262,415

13 Claims. (Cl. 49—18)

This invention relates to improvements in apparatus for blowing and cooling articles of glassware.

As described in Patent No. 2,123,145, granted July 5, 1938, to Karl E. Peiler, assignor to Hartford-Empire Co., it has been proposed to provide apparatus for blowing and cooling glassware by the use of a combination blow head and internal cooling mechanism which is adapted to apply a selected blowing pressure and maintain such pressure in a hollow glass parison in a mold without escape or waste of the blowing pressure fluid for a predetermined period of time and then to permit escape or exhaust of the pressure fluid from the interior of the article for a further period of time to effect internal cooling of the article while maintaining therein sufficient pressure to continue desirable external absorption of heat from the article by the mold.

An object of the present invention is to improve apparatus of the type above described for blowing and cooling glassware, particularly in the features thereof relating to control of the application of pressure fluid to the interior of the hollow parison or glass article in the mold for the blowing thereof and of the escape or exhaust of pressure fluid from the interior of the article to effect internal cooling thereof.

A further object of the invention is to provide an apparatus of the character described for blowing and cooling glassware, having conveniently and readily operable means by which the operative position of a combination blow head and internal cooling mechanism of the apparatus may be adjusted for articles of different heights without changing or interrupting the operations of associate mechanism of the apparatus for controlling application and exhaust of pressure fluid to and from said articles.

A still further object of the invention is the provision in apparatus of the character described of a novel means for and way of effecting final exhaust of pressure fluid to the atmosphere, adapted to prevent fluid exhaust at high temperature, such as steam, from coming into contact with an operator or attendant for adjacent glass machinery.

A further object of the invention is the provision of a simple and efficient device for use in conjunction with glassware blowing and cooling apparatus of the character described for scavenging residual blowing and cooling fluid from the interior of the article after the blowing and main cooling operations have been completed, whereby to increase the durability of the article.

Other objects and advantages of the invention will hereinafter be pointed out or will become apparent from the following description of an illustrative structural embodiment of the present invention, as shown in the accompanying drawings, in which:

Fig. 2 is a fragmentary vertical sectional view, substantially along the line 2—2 of Fig. 1, showing part of a valve controlled passage for conducting operating pressure fluid to an air motor of valve operating mechanism which may be included in apparatus of the present invention;

Fig. 3 is a vertical sectional view, substantially along the line 3—3 of Fig. 4, showing adjustable supporting and pressure fluid conducting structural parts of the apparatus of the present invention;

Fig. 4 is a plan view of the structure shown in Fig. 1, with portions broken away and other portions shown in section, the view showing the general arrangement of the component parts of the improved apparatus;

Fig. 5 is a vertical section along the line 5—5 of Fig. 4, showing pressure fluid intake and exhaust valves for controlling application of pressure fluid to and exhaust of pressure fluid from an associate combination blow head and cooling mechanism of the improved apparatus, together with cams for effecting timed opening of these valves.

Fig. 6 is a sectional view substantially along the jagged line 6—6 of Fig. 4 but with the valves and their operating cams shown out of their true positions so that the cams appear to be on parallel shafts instead of on the same shaft as actually is the case, as shown in Fig. 5;

Fig. 7 is a fragmentary detail view, mainly in side elevation as viewed from a plane indicated at 7—7 in Fig. 4 but with portions broken away and other portions shown in section, showing details of an escapement mechanism for effecting step by step rotation of the cams shown in Figs. 5 and 6;

Figure 10:
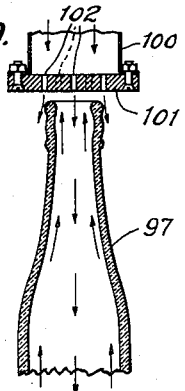

Fig. 9 is a perspective assembly view, showing a scavenging device as provided by the present invention in operative relation to a conveyor by which the articles undergoing treatment are conducted away from the forming machine and the associate blowing and main cooling mechanisms; and Fig. 10 is a fragmentary vertical sectional view, showing an apertured portion of the scavenging device and a subjacent portion of an upright glass bottle through which air is being circulated by the scavenging device.

Referring to the drawings, I show in Figs. 1, 3, 4 and 9 a vertically disposed reciprocable rod 10 which may be the blow head supporting and operating piston rod of the well known Hartford I. S. forming machine. This rod is supported and operated by a piston (not shown) in a vertically disposed cylinder 11, which is shown in part in Figs. 1, 3 and 9. The upper head 12 of this cylinder is shown in these views and also in Fig. 4.

Figure 1:
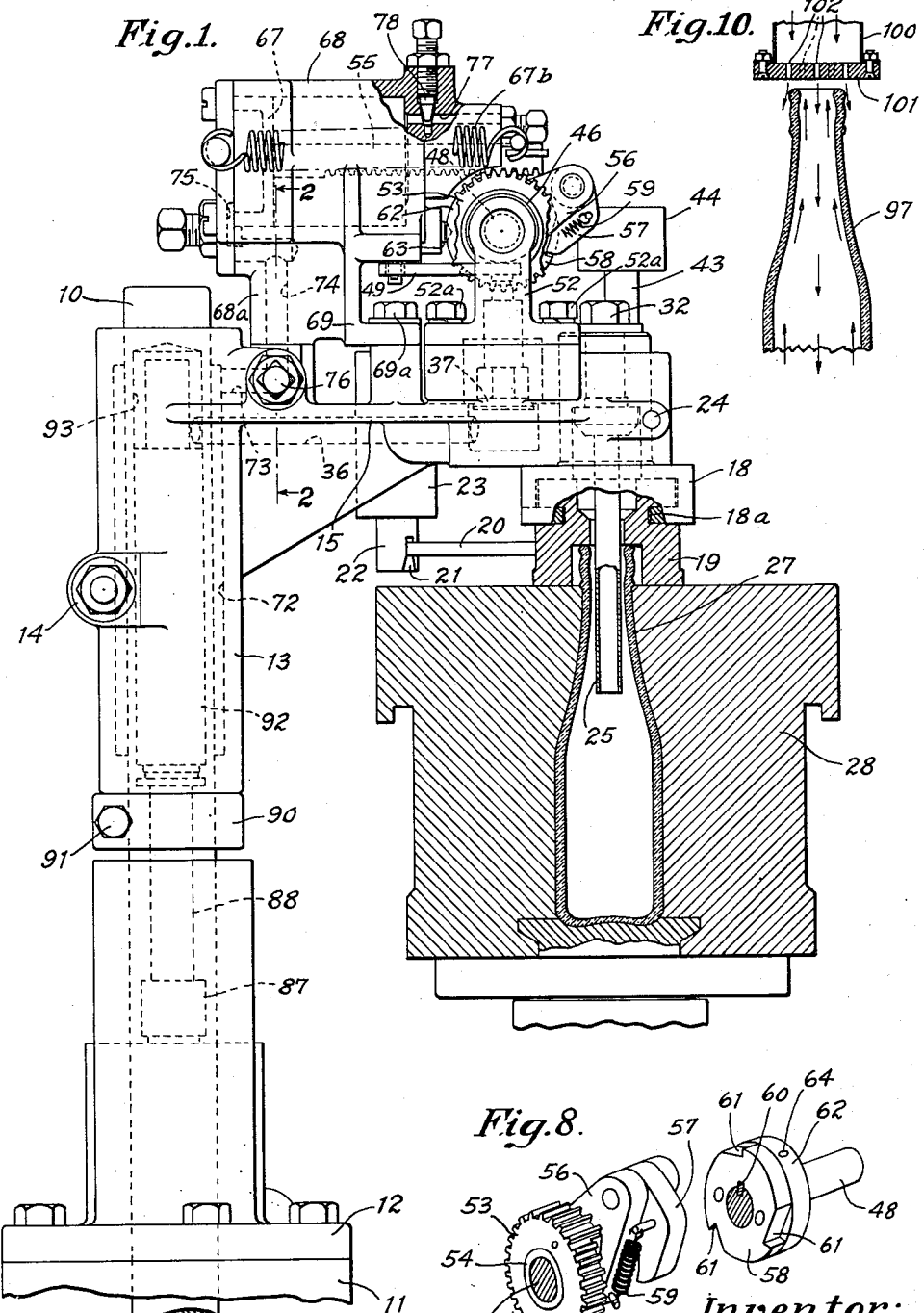
Fig. 1 is a view, mainly in side elevation but with portions broken away and other portions shown in section, showing improved apparatus for blowing and cooling glassware as applied to the blow head supporting and operating mechanism of the Hartford I. S. forming machine.

A sleeve 13, Figs. 1, 3 and 9, has a clamp portion 14, Figs. 1 and 9, by which it is secured releasably to the upper portion of the vertical rod 10. This sleeve carries a laterally extending bracket arm 15, Figs. 1 and 9, which is utilized to support and carry novel combination blow head and cooling mechanism and associate control devices of the present invention.

The outer end portion of the carrier 15 is provided with a vertical bore or opening 16 (see Fig. 6) in which is mouted the hollow stem 17 of a chuck or holder 18 for a blow head 19 (see Figs. 1 and 9). The blow head 19 may be coupled to its holder 18 by a bayonet joint structural arrangement, indicated at 18—a, Fig. 1, or in any other suitable known way. When a bayonet joint coupling arrangement is employed, as shown, a laterally extending pin 20 may be provided on the blow head in engagement with a notch 21 in the lower end portion of a keeper 22 for preventing the blow head from rotating in its holder to position to be accidentally disengaged from the latter.

The holder 18 is retained in the vertical opening 16 in the carrying arm 15 in any suitable known way, as by a retaining pin or key 24, Figs. 1, 4 and 9.

A fluid pressure applying tube 25, Figs. 1, 6 and 9 depends from a supporting plug 26, Fig. 6, in the blow head holder and may extend below the blow head 19 a sufficient distance to depend a substantial distance in a hollow article, such as the bottle 27, in a blow mold 28 when the blow head 19 is in operative position on that mold, Fig. 1. The upper end of the tube 25 may be secured in place in a central bore 29 in the plug 26 (see Fig. 6). The lower end portion of this plug is enlarged to divide the interior of the body 17 of the blow head holder into an upper chamber 30 and a lower chamber 31, the stem of the plug extending upwardly through the chamber 30 and being secured in place in the top portion of the part 17, as by a cap bolt 32.

The upper chamber 30 may communicate with the central bore 29 through radial ports 33 and thence with the interior of the tube 25 (Fig. 6). The chamber 30 also communicates through a suitable passage 34 in the supporting carrier 15 with the delivery end of the chamber of an intake valve 35. The valve 35 may be located in a suitable pocket or recess 35a in the supporting arm 15. The valve 35 may be supplied with a suitable fluid under pressure from a supply passage 36 in the supporting arm 15. Means for supplying the pressure fluid to the passage 36 will presently be described. A tappet valve 37 is urged by a spring 38 against its seat 39 in the intake valve 35 and, when thus seated, prevents flow of the pressure fluid to the tube 25.

The lower chamber 31 in the holder for the blow head communicates through a passage 40 with the interior of an exhaust valve 41, also carried by the arm 15 and also controlled by a spring pressed tappet valve member indicated at 42. The exhaust valve 41 is operatively connected with an exhaust pipe 43 having an upright closed terminal portion surrounded by the spaced depending skirt of a cap or hood shaped fluid exhaust spreading and diffusing baffle head 44, the terminal portion of the exhaust pipe having lateral apertures, such as shown at 45, Fig. 6, opening into the interior of this head.

The tappet valve members 37 and 42 are opened at predetermined desirable times by cams 46 and 47, respectively, on a cam shaft 48. These cams act on the stems of the associate tappet valves through pivoted intermediate contact arms 49 and 50, respectively, as is usual in the operation of tappet valves.

Figure 8:
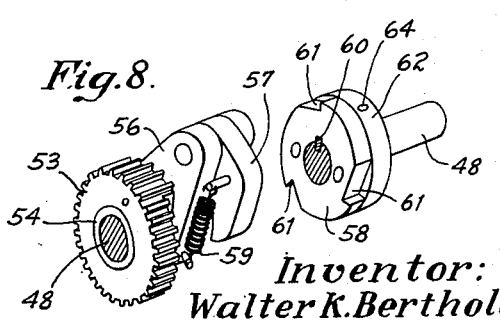
Fig. 8 is a perspective view of parts of the escapement mechanism.

As shown best in Fig. 5, the cam shaft 48 may be a short horizontal shaft having its end portions supported in bearings 51 in a supporting frame 52. This supporting frame may overlie the casings or body structures of the associate intake and exhaust valves 35 and 41, respectively, and retain them in place on the carrying arm 15, the frame being secured to the latter by cap bolts 52a, Figs. 1, 3 and 4 or in any other suitable known manner. As best seen in Fig. 5, the cam shaft 48 may carry not only the cams 46 and 47, respectively, for actuating the associate valves but certain parts of an escapement mechanism for effecting desirable step-by-step rotary movement of the shaft. This escapement mechanism comprises a gear 53 having a liner or bushing 54 mounted to turn freely on the shaft 48 and operable by a rack bar 55. The gear 53 carries a crank arm 56, Figs. 1, 7 and 8, on which a ratchet pawl 57 is pivotally supported. This pawl 57 is held against the periphery of a ratchet wheel 58 by a spring 59. The ratchet wheel 58 is keyed to the shaft 48, as at 60, Figs. 5, 7 and 8, and has three equally spaced notches 61, Figs. 7 and 8, in its periphery.

When the pinion 53 is rotated by the rack 55 through one-third of a complete revolution, the pawl 57 will turn the ratchet wheel 58 and the cam shaft through the same arc. Reverse movement of the rack bar and pinion will withdraw the pawl from one of the notches 61 to the preceding notch 61 in the ratchet wheel so that the next projection of the rack bar will effect a further rotary movement of the cam shaft through one-third of a complete revolution. In order to assure cessation of rotation of the cam shaft during the return or retractive movements of the pawl and to prevent overrunning of the cam shaft, a latch wheel 62, Figs. 5, 7 and 8, may be keyed to the cam shaft adjacent to the ratchet wheel 58 for cooperation with a spring pressed latch pin 63 (Fig. 7) the latch wheel having suitable indentations 64 in its periphery with which the end of the latch pin 63 engages. As shown, these indentations are shallow conical depressions in which the short conical end of the latch pin may seat, the arrangement being such that a substantial torque on the latch wheel will turn the latter underneath the end of the latch pin, the latter then being cammed outward against its spring 65 so as to ride around the periphery of the latch wheel until the cam shaft stops with the next indentation in place to receive the tip of the latch pin. The compression of the spring 65 may be adjusted, as by the adjusting screw 66, to regulate the pressure of the latch pin on the latch wheel.

The rack bar 55 may constitute the outer end portion of the rod of a piston 67 in a cylinder 68, Figs. 1 and 4. The cylinder 68 may be supported on the main carrying arm 15, as through the agency of a bracket 69, Figs. 1, 3 and 9, and fastening means such as the cap bolt 69a, Figs. 1 and 3, so that the rack bar will be reciprocated in engagement with the pinion 53.

The reciprocation of the piston 67 to effect one of the intermittent rotary movements of the cam shaft may be caused by the application of pressure fluid to the rear end of the cylinder 68, back of the piston 67. As shown, the vertical rod 10 has a central passage 70 communicating through a lateral passage 71, Fig. 3, with a vertical passage 72 in the inner wall of the sleeve 13 and thence through a lateral passage 73 in the arm 15, Fig. 1, and a vertical passage 74 in a base or filler block 68a beneath the cylinder 68 to a passage 75 in the head of such cylinder. A needle valve 76, Figs. 2 and 3, may be adjusted to control the volume of fluid passing through these communicating passages to the cylinder 68. The passage 70 in the vertical rod 10 may be connected through the usual timer (not shown), of the I. S. forming machine with any suitable source of pressure fluid, such as compressed air, so that a forward stroke of the piston 67 will be commenced at a predetermined time in each cycle of operations of the forming machine. Such forward stroke of the piston will operate the escapement mechanism to turn the cam shaft one-third of a revolution, as has been described. Exhaust of air in advance of the piston may take place through an exhaust passage 77, Fig. 1, which may be controlled by a needle valve 78. This will afford a control of the speed of the intermittent rotary movement of the cam shaft.

Exhaust of air back of the piston 67 after each forward stroke thereof may take place through the same passages by which the operating pressure fluid was supplied. The return stroke of the piston may be effected by springs 67b which, as seen in Figs. 1, 4, and 7, are connected at their opposite ends with the cylinder and the piston rod, respectively, so as to be placed under tension by the forward stroke of the piston.

The cam shaft 48 may be given its intermittent or step-by-step rotary movements by any other suitable known operating mechanism or such operating mechanism might be such as to effect continuous rotary movement of the cam shaft at a suitably slow speed or at a suitably varied speed to produce the desired operations of the tappet valve members 37 and 42.

Pressure fluid for effecting blowing and cooling of the article in the blow mold may be supplied to the passage 36, Fig. 6, by the following means. A supply pipe 79, Figs. 3 and 9, communicates with a valve 80 which may be provided on the head 12 of the cylinder 11. A tappet valve 81 is urged upwardly against a downwardly facing seat 82 in the valve 80 by a spring 83. When the valve is open, against the action of the spring 83, as shown in Fig. 3, the pressure fluid may pass through radial ports 84 to the interior or bore 85 of the upwardly extending stem 86 of the tappet valve. A hollow head 87 on the lower end of a tube 88 constitutes a means for depressure and thus opening the tappet valve 81.

The tube 88 is carried by a laterally projecting portion 89 of a collar 90 which is clamped to the rod 10, as by the clamping mechanism indicated at 91, Fig. 1. Consequently, when the rod 10 is moved axially in a downward direction from its upper limit to the position shown in Fig. 3, the head 87 will first contact the upper end of the hollow valve stem 86 and will then effect downward movement and opening of the valve 81 as the further downward movement of the rod 10 continues.

The tube 88 is telescopically received in a sleeve 92 which has its upper end portion secured in a vertical chamber 93 in a lateral enlargement or embossed portion 94 of the sleeve 13. A suitable packing gland 95 is provided at the juncture of the tube 88 and sleeve 92 so that a sliding relative adjustment of these two members may be effected without permitting leakage of pressure fluid at their place of juncture. This is of advantage in adjusting the operating position of the blow head 19 for use with molds of different heights, as in the manufacture of articles of glassware of different heights, as the sleeve 13 and all the parts carried thereby may be adjusted vertically on the rod 10 without changing the position of the collar 90 or the tube 88 and hence without changing in any way the operation of the valve 81, the sleeve 92 simply sliding on the tube 88 which remains in a fixed position with relation to the rod 10.

The pressure fluid employed for blowing and cooling the articles, of glassware may pass from the tube 88 into the chamber 93 and thence through a lateral port 96 to the passage 36 previously described.

As shown in Fig. 6, the contours of the cams 46 and 47 and their angularly related positions on the cam shaft 40 may be such that a rotary movement of the cam shaft in the direction of the arrows through one-third of a revolution from a position at which both valves 35 and 41 are closed will effect opening of the intake valve 35 while the exhaust valve 41 remains closed. The next rotary movement of the cam shaft will maintain the intake valve 35 open and will open the exhaust valve 42 also. During the third rotary movement of the cam shaft, both valves will be closed. Thus, the downward movement of the blow head to an operative position on a mold will first open the control valve 81 so that fluid under pressure will pass to the intake valve 35 and will be there stopped until such time as the valve 35 has been opened by its cam. This time is controlled from the associate timer which controls the operation of the air motor for turning the cam shaft. When the intake valve has been opened, fluid under pressure passes through the blow head into the hollow glass article or parison in the mold and effects blowing thereof against the mold walls. At a predetermined time thereafter, the further rotary movement of the cam shaft will cause opening of the exhaust valve which will permit exhaust of pressure fluid from the blown article. This will extract heat from the interior of such article. The cooling of the article will continue until the third rotary movement of the cam shaft closes both valves. It may be noted at this point that the exhaust will be broken up and diffused into the atmosphere by the hooded exhaust head 44. This is a safety provision which is designed to prevent injury to an operator of the adjacent machinery who might otherwise be burned or suffer inconvenience from a stream or jet of hot exhaust fluid, especially if steam is employed for blowing and cooling the glass articles.

The fluid under pressure employed for the blowing and/or cooling of the glass articles may be any suitable fluid, such as steam, vapor, air or other gas, or any suitable combination or mixture of fluids. I have found that the chemical durability of the glass articles which have been blown and/or cooled substantially as described may be increased by scavenging from the interior thereof the residual moisture that otherwise would remain therein, particularly when steam is employed for blowing and/or cooling. This scavenging should be effected before residual moisture left by the blowing and/or cooling of the article has reacted harmfully with the glass of the article. Moisture introduced into the hot article will effect improvement of the chemical durability thereof if left therein for a brief time—less than that at which harmful reaction would occur—and is then scavenged from the article. This time may vary with articles of different kinds, sizes and compositions. A scavenging device suitable for this purpose will now be described.

In Fig. 9, glass articles 97, which have been blown and cooled by operations such as those just described, are shown at various points along their path of movement from the forming machine to further machinery, such as an annealing lehr, in which the articles are to undergo further treatment. One of the articles 97 is on dead plate 98 between the forming machine and a conveyor 99 by which the articles may be transported to the receiving end of the lehr (not shown). This dead plate 98 may be apertured and cooling air may be blow through the apertures thereof upwardly around the glass article. On the conveyor 99, the articles are moved in turn beneath a novel scavenging device 100 which may be in the form of a hollow casing of downwardly increasing area in cross section, having a flat bottom 101 provided with numerous closely spaced apertures 102, each of which is of relatively small size, as approximately $\frac{3}{32}$ inch in diameter. A suitable fluid, such as dry air under pressure, may be delivered to the interior of the device 100, as through a pipe 103, and the device may be supported in any suitable known way so that the flat bottom thereof will be spaced a short distance above the tops of the articles passing therebeneath. The pressure fluid entering the device will pass through the orifices 102 at relatively low pressure and in small jets downwardly into the open upper end or mouth of the article 97. These jets of air are sufficiently small in cross section and at sufficiently low pressure to avoid building up or entrapping air in the interior of the articles 97 and thus will cause a sufficient circulation of air in each such article to force out any residual steam or moisture that otherwise would remain in the article. The operation is illustrated to advantage in Fig. 10.

While the scavenging operation is deemed to be of especial utility in the case of an article of glassware that has been blown and/or cooled by steam or a fluid having a substantial moisture content, it may be productive of considerable benefit when any other suitable fluid has been used for the blowing and/or cooling of the article. Also, it will be of benefit if the steam or moisture containing fluid has been introduced into the article when hot at any time in any suitable way.

The method of treating glass articles to increase the chemical durability thereof, as disclosed herein, is not claimed in this application but is also disclosed and is claimed in my copending application Serial No. 264,479, filed March 27, 1939, for a Method of increasing the durability of glassware.

Various changes may be made in the details of construction and operation of apparatus embodying the invention without departing from the spirit and scope thereof.

What I claim is:

1. Apparatus for blowing and internally cooling articles of glassware comprising a movable combination blow head and pressure fluid delivery tube adapted for cooperation with a mold to connect the interior of a hollow glass article in the mold with an outlet to the atmosphere and with a source of blowing and cooling pressure fluid, valves mounted for movement with said combination blow head and pressure fluid delivery tube and respectively controlling inflow of said pressure fluid from said source to the interior of said glass article and exhaust of fluid from said article, and cams for operating said valves.

2. Apparatus for blowing and internally cooling articles of glassware in a mold comprising a blow head, a hollow tube fixed with relation to the blow head so as to depend through the blow head into a hollow glass article in said mold when said blow head is disposed on said mold over the glass article therein, a passage for supplying pressure fluid to said tube, a separate passage for exhausting pressure fluid from said blow head, separate valves controlling said passages, and means for operating said valves.

3. Apparatus for blowing and internally cooling hollow articles of glassware in a mold comprising a blow head, means for raising and lowering the blow head to and from an operative position on said mold over a hollow glass article in the mold, a tube movable with and depending through said blow head so as to enter the hollow glass article in the mold when the blow head is disposed on said mold, pressure fluid conducting means connected with said tube, a normally closed valve controlling passage of pressure fluid through said pressure fluid conducting means toward said tube, and means operated by said means for raising and lowering the blow head to open said valve when said blow head is lowered onto said mold.

4. Apparatus for blowing and internally cooling hollow articles of glassware in a mold comprising a blow head, means for raising and lowering the blow head to and from an operative position on said mold over a hollow glass article in the mold, a tube movable with and depending through said blow head so as to enter the hollow glass article in the mold when the blow head is disposed on said mold, pressure fluid conducting means connected with said tube, a normally closed valve controlling passage of pressure fluid through said pressure fluid conducting means toward said tube, means for automatically opening said valve when said blow head is lowered onto said mold, an intake valve located between said first valve and said tube for controlling the time of application of the pressure fluid to said tube, means for operating said intake valve, and means for exhausting pressure fluid from said blow head to the atmosphere after a predetermined period of application of pressure fluid to the tube.

5. Apparatus for blowing and cooling articles of glassware in a mold comprising a pressure fluid delivery tube, a vertically movable blow head carrying said tube so as to lower the tube into a hollow glass article in said mold when said blow head is lowered to position to rest on the mold over said article, separate passages for conducting pressure fluid from a source of supply to said tube and for exhausting pressure fluid from said blow head, respectively, separate normally closed valves mounted for movement with said blow head and controlling said passages, and cam means for operating said valves so that, starting with both valves closed, the valve controlling the passage for conducting pressure fluid to the tube will be opened at a predetermined time prior to the opening of the valve controlling the exhaust passage.

6. Apparatus for blowing and internally cooling hollow articles of glassware comprising a combination blow head and pressure fluid delivery tube, means for moving said combination blow head and pressure fluid delivery tube to and from an operative position at which the blow head rests on a mold having a hollow glass parison therein, passages respectively connected with the tube and with the interior of the blow head for conducting pressure fluid to the tube and for exhausting pressure fluid from the blow head, a normally closed intake valve controlling flow of pressure fluid through the passage connected with said tube, a normally closed exhaust valve controlling exhaust of pressure fluid through the exhaust passage, a cam shaft adjacent to said valves, and cams on said cam shaft having contours so related that a complete rotation of the cam shaft will cause opening of the intake valve while the exhaust valve remains closed, subsequent opening of the exhaust valve while the intake valve remains open, and still later closing of both valves.

7. Apparatus for blowing and internally cooling hollow articles of glassware comprising a combination blow head and pressure fluid delivery tube, said delivery tube depending through and below the level of the blow head, means for moving said combination blow head and pressure fluid delivery tube to and from position to cause the blow head to rest on a mold having a hollow glass parison therein and the pressure fluid delivery tube to depend into the interior of said hollow glass parison, passages respectively connected with the tube and with the interior of the blow head for conducting pressure fluid to the tube and for exhausting pressure fluid from the blow head, a normally closed intake valve controlling flow of pressure fluid through the passage connected with said tube, a normally closed exhaust valve controlling exhaust of pressure fluid through said exhaust passage, a cam shaft adjacent to said valves, cams on said cam shaft having contours so related that a complete rotation of the cam shaft will cause opening of the intake valve while the exhaust valve remains closed, subsequent opening of the exhaust valve while the intake valve remains open, and still later closing of both valves, and means for operating said cam shaft.

8. Apparatus for blowing and internally cooling hollow articles of glassware comprising a combination blow head and pressure fluid delivery tube, said delivery tube depending through and below the level of the blow head, means for moving said combination blow head and pressure fluid delivery tube to and from position to cause the blow head to rest on a mold having a hollow glass parison therein and the pressure fluid delivery tube to depend into the interior of said hollow glass parison, passages respectively connected with the tube and with the interior of the blow head for conducting pressure fluid to the tube and for exhausting pressure fluid from the blow head, a normally closed intake valve controlling flow of pressure fluid through the passage connected with said tube, a normally closed exhaust valve controlling exhaust of pressure fluid through said exhaust passage, a cam shaft adjacent to said valves, cams on said cam shaft having contours so related that a complete rotation of the cam shaft will cause opening of the intake valve while the exhaust valve remains closed, subsequent opening of the exhaust valve while the intake valve remains open, and still later closing of both valves, means for causing intermittent rotary movements of said cam shaft, and means for regulably controlling the speed of each such intermittent rotary movement.

9. Apparatus for blowing and internally cooling hollow articles of glassware in the mold comprising a combination blow head and pressure fluid delivery tube, said tube depending through and to a level below the bottom of the blow head, a vertically reciprocable carrier supporting and operating said combination blow head and pressure fluid tube periodically to lower said blow head onto a mold so that said tube will depend into the interior of a hollow glass article in the mold, a pressure fluid supply passage connected with the interior of said tube, a pressure fluid exhaust passage connected with said blow head, normally closed intake and exhaust valves carried by said carrier and respectively controlling said pressure fluid supply and exhaust passages, cams supported on said carrier for opening the intake valve and the exhaust valve in timed relation with each other, a fluid pressure motor, an escapement mechanism operated by said motor for effecting intermittent rotary movements of said cams, and regulably controlled exhaust means for said fluid pressure motor for controlling the speed of said intermittent rotary movements of said cams.

10. Apparatus for blowing and cooling articles of glassware comprising a blow head, a tube depending through said blow head and fixed thereto, means for operating said blow head and tube as a unit to move the blow head to and from position to rest upon a mold over a hollow glass article in the mold and the tube in position to depend into said hollow glass article, a pressure fluid supply passage connected with said tube, a pressure fluid exhaust passage connected with the blow head, separate valves controlling said passages, and a hooded exhaust head connected with said exhaust passage for breaking up and diffusing fluid exhaust into the atmosphere.

11. Apparatus for blowing and cooling articles of glassware in a mold comprising a combination blow head and pressure fluid delivery tube, the tube being fixed to said head in position to depend through the head below the level thereof, means for reciprocating said combination blow head and pressure delivery tube vertically to and from an operative position with respect to a mold and a hollow glass article in said mold, means for conducting pressure fluid to said tube, means for exhausting pressure fluid from the blow head, valves mounted for movement with said combination blow head and pressure fluid delivery tube for controlling said means for conducting pressure fluid to the tube and for exhausting pressure fluid from the blow head, respectively, and means for operating said valves, said means for reciprocating the combination blow head and tube vertically comprising cooperative parts relatively adjustable to vary the level of the operative position thereof without altering the functioning of the means for operating said valves.

12. Apparatus for applying pressure fluid to articles of glassware in a mold comprising a vertically reciprocable vertical shaft, a vertically adjustable lateral arm mounted on said shaft, a pressure fluid delivery mechanism carried by said arm in position to be lowered into operative relation with said mold when said shaft is at the lower end of its downward stroke, and a pressure fluid supply system connected with said delivery mechanism, said supply system including a stationary normally closed valve and a pressure fluid conducting member movable with the shaft and located in position to open said valve and to receive pressure fluid therefrom as said shaft approaches the lower end of its downward stroke.

13. Apparatus for applying pressure fluid to articles of glassware in a mold comprising a vertically reciprocable vertical shaft, a vertically adjustable lateral arm mounted on said shaft, a pressure fluid delivery mechanism carried by said arm in position to be lowered into operative relation with said mold when said shaft is at the lower end of its downward stroke, and a pressure fluid supply system connected with said delivery mechanism, said supply system including a stationary normally closed valve and a pressure fluid conducting member movable with the shaft and located in position to open said valve and to receive pressure fluid therefrom as said shaft approaches the lower end of its downward stroke, said supply system also including telescopically co-engaged pressure fluid conducting members supported for movement with said shaft and said lateral arm, respectively, whereby said arm may be adjusted vertically on said shaft to vary the level of the operative position of said delivery mechanism without interrupting the functioning of said pressure fluid supply system.

WALTER K. BERTHOLD.